(12) United States Patent
Barkan et al.

(10) Patent No.: US 12,412,055 B1
(45) Date of Patent: Sep. 9, 2025

(54) BIOPTIC INDICIA READER ASSEMBLY

(71) Applicant: Zebra Technologies Corporation, Lincolnshire, IL (US)

(72) Inventors: Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/898,910

(22) Filed: Sep. 27, 2024

(51) Int. Cl.
*G06K 7/10* (2006.01)
(52) U.S. Cl.
CPC .................................. *G06K 7/1096* (2013.01)
(58) Field of Classification Search
CPC ....................................................... G06K 7/1096
USPC ......................................................... 235/454
See application file for complete search history.

(56) References Cited

U.S. PATENT DOCUMENTS

| | | | |
|---|---|---|---|
| 11,023,698 B1* | 6/2021 | Handshaw | G06K 7/10792 |
| 2010/0282850 A1* | 11/2010 | Olmstead | G06K 7/10722 235/440 |
| 2021/0190579 A1* | 6/2021 | Barkan | H10F 39/80 |

* cited by examiner

*Primary Examiner* — Toan C Ly
(74) *Attorney, Agent, or Firm* — Yuri Astvatsaturov

(57) ABSTRACT

An example bioptic indicia reader assembly includes: a housing having an upper housing portion and a generally upright window positioned in the upper housing portion; and a platter having a proximal edge adjacent the upper housing portion. The upper housing portion comprises a first protrusion located on a first side of a longitudinal centerline of the bioptic indicia reader assembly and a second protrusion located on a second side of the longitudinal centerline. The first protrusion comprises a first camera having a first field-of-view (FOV) having an inner first lateral boundary that extends behind and at an angle to the proximal edge of the platter and the second protrusion comprises a second camera having a second FOV having an inner third lateral boundary that extends behind and at an angle to the proximal edge of the platter.

21 Claims, 12 Drawing Sheets

BIOPTIC INDICIA READER ASSEMBLY

BACKGROUND

Bioptic indicia reader assemblies, such as those used in retail applications, can include high-end vision systems that include overhead cameras to provide expanded vision capabilities. However, overhead camera designs will not work with every installation, depending on the user's specific furniture layout and requirements. It would be beneficial to provide a bioptic indicia reader assembly that provides the expanded vision capabilities of a high-end vision system with overhead cameras with components that are contained within the footprint/volume of the standard bioptic indicia reader (i.e., without external cameras positioned above the bioptic indica reader).

SUMMARY

In an embodiment, the present invention is a bioptic indicia reader assembly, including a housing and a platter. The housing has a lower housing portion, an upper housing portion extending above the lower housing portion, and a generally upright window positioned in the upper housing portion. The platter has a proximal edge adjacent the upper housing portion, a first lateral edge extending non-parallel to the proximal edge, a second lateral edge, opposite the first lateral edge, extending non-parallel to the proximal edge, a distal edge, opposite the proximal edge, extending non-parallel to the first and second lateral edges, a top surface facing a product scanning area, and a generally horizontal window positioned in the platter. The upper housing portion comprises a first protrusion located on a first side of a longitudinal centerline of the bioptic indicia reader assembly and extending forward of the generally upright window and towards the distal edge of the platter and a second protrusion located on a second side of the longitudinal centerline, opposite the first side, and extending forward of the generally upright window and towards the distal edge of the platter. The first protrusion comprises a first camera having a first field-of-view (FOV) having an inner first lateral boundary that extends behind and at an angle to the proximal edge of the platter and the second protrusion comprises a second camera having a second FOV having an inner third lateral boundary that extends behind and at an angle to the proximal edge of the platter.

In a variation of this embodiment, the angle between the inner first lateral boundary of the first FOV and the proximal edge of the platter is greater than or equal to 1 degree and less than or equal to 25 degrees.

In another variation of this embodiment, the angle between the inner third lateral boundary and the proximal edge of the platter is greater than or equal to 1 degree and less than or equal to 25 degrees.

In another variation of this embodiment, the first FOV and the second FOV encompass at least 90% of a footprint of the platter.

In another variation of this embodiment, the first FOV has an outer second lateral boundary, opposite the inner first lateral boundary, that extends outside of and at an angle to the first lateral edge of the platter.

In another variation of this embodiment, the second FOV has an outer fourth lateral boundary, opposite the inner third lateral boundary, that extends outside of and at an angle to the second lateral edge of the platter.

In another variation of this embodiment, a first upper boundary of the first FOV and the top surface of the platter form an angle that is greater than or equal to 50 degrees and less than or equal to 100 degrees.

In another variation of this embodiment, a second upper boundary of the second FOV and the top surface of the platter form an angle that is greater than or equal to 50 degrees and less than or equal to 100 degrees.

In another variation of this embodiment, the first protrusion comprises a third camera having a third FOV that is directed away from the first lateral edge of the platter and that has a third lower boundary that extends at an angle below the top surface of the platter.

In another variation of this embodiment, the second protrusion comprises a fourth camera having a fourth FOV that is directed away from the second lateral edge of the platter and has a fourth lower boundary that extends at an angle below the top surface of the platter.

In another embodiment, the present invention is a bioptic indicia reader assembly including a housing and a platter. The housing has a lower housing portion, an upper housing portion extending above the lower housing portion, and a generally upright window positioned in the upper housing portion. The platter has a proximal edge adjacent the upper housing portion, a first lateral edge extending non-parallel to the proximal edge, a second lateral edge, opposite the first lateral edge, extending non-parallel to the proximal edge, a distal edge, opposite the proximal edge, extending non-parallel to the first and second lateral edges, a top surface facing a product scanning area, and a generally horizontal window positioned in the platter. The upper housing portion comprises a first protrusion located on a first side of a longitudinal centerline of the bioptic indicia reader assembly and extending forward of the generally upright window and towards the distal edge of the platter and a second protrusion located on a second side of the longitudinal centerline, opposite the first side, and extending forward of the generally upright window and towards the distal edge of the platter. The first protrusion comprises a first camera having a first field-of-view (FOV) having an inner first lateral boundary and an outer second lateral boundary and the second protrusion comprises a second camera having a second FOV having an inner third lateral boundary and an outer fourth lateral boundary. The inner first lateral boundary and the inner third lateral boundary form an angle that is greater than or equal to 170 degrees and less than or equal to 190 degrees.

In a variation of this embodiment, the inner first lateral boundary extends behind and at an angle to the proximal edge of the platter; and the inner third lateral boundary extends behind and at an angle to the proximal edge of the platter.

In another variation of this embodiment, the angle between the inner first lateral boundary of the first FOV and the proximal edge of the platter is greater than or equal to 1 degree and less than or equal to 25 degrees.

In another variation of this embodiment, the angle between the inner third lateral boundary and the proximal edge of the platter is greater than or equal to 1 degree and less than or equal to 25 degrees.

In another variation of this embodiment, the first FOV and the second FOV encompass at least 90% of a footprint of the platter.

In another variation of this embodiment, the outer second lateral boundary extends outside of and at an angle to the first lateral edge of the platter.

In another variation of this embodiment, the outer fourth lateral boundary extends outside of and at an angle to the second lateral edge of the platter.

In another variation of this embodiment, a first upper boundary of the first FOV and the top surface of the platter form an angle that is greater than or equal to 50 degrees and less than or equal to 100 degrees.

In another variation of this embodiment, a second upper boundary of the second FOV and the top surface of the platter form an angle that is greater than or equal to 50 degrees and less than or equal to 100 degrees.

In another variation of this embodiment, the first protrusion comprises a third camera having a third FOV that is directed away from the first lateral edge of the platter and that has a third lower boundary that extends at an angle below the top surface of the platter.

In another variation of this embodiment, the second protrusion comprises a fourth camera having a fourth FOV that is directed away from the second lateral edge of the platter and has a fourth lower boundary that extends at an angle below the top surface of the platter.

In another embodiment, the present invention is a vision reader assembly for use with a bioptic indicia reader, the vision reader assembly including a first housing and a second housing.

The first housing is configured to be removably secured to a first side of an upper housing portion of the bioptic indicia reader assembly such that the first housing extends forward of a generally upright window of the upper housing portion and towards a distal edge of a platter of the bioptic indicia reader assembly and comprises a first camera having a first field-of-view (FOV) having an inner first lateral boundary that extends behind and at an angle to a proximal edge of the platter.

The second housing is configured to be removably secured to a second side, opposite the first side, of the upper housing portion of the bioptic indicia reader assembly such that the second housing extends forward of the generally upright window and towards the distal edge and comprises a second camera having a second field-of-view (FOV) having an inner third lateral boundary that extends behind and at an angle to the proximal edge of the platter.

In a variation of this embodiment, the angle between the inner first lateral boundary of the first FOV and the proximal edge of the platter is greater than or equal to 1 degree and less than or equal to 25 degrees.

In another variation of this embodiment, the angle between the inner third lateral boundary and the proximal edge of the platter is greater than or equal to 1 degree and less than or equal to 25 degrees.

In another variation of this embodiment, the first FOV and the second FOV encompass at least 90% of a footprint of the platter.

In another variation of this embodiment, the first FOV has an outer second lateral boundary, opposite the inner first lateral boundary, that extends outside of and at an angle to a first lateral edge of the platter.

In another variation of this embodiment, the second FOV has an outer fourth lateral boundary, opposite the inner third lateral boundary, that extends outside of and at an angle to a second lateral edge of the platter.

In another variation of this embodiment, a first upper boundary of the first FOV and a top surface of the platter form an angle that is greater than or equal to 50 degrees and less than or equal to 100 degrees.

In another variation of this embodiment, a second upper boundary of the second FOV and the top surface of the platter form an angle that is greater than or equal to 50 degrees and less than or equal to 100 degrees.

In another variation of this embodiment, the first housing comprises a third camera having a third FOV that is directed away from a first lateral edge of the platter and that has a third lower boundary that extends at an angle below a top surface of the platter.

In another variation of this embodiment, the second housing comprises a fourth camera having a fourth FOV that is directed away from a second lateral edge of the platter and has a fourth lower boundary that extends at an angle below a top surface of the platter.

In another embodiment, the present invention is a bioptic indicia reader assembly including a housing and a platter. The housing has a lower housing portion, an upper housing portion extending above the lower housing portion, and a generally upright window positioned in the upper housing portion. The platter has a proximal edge adjacent the upper housing portion, a first lateral edge extending non-parallel to the proximal edge, a second lateral edge, opposite the first lateral edge, extending non-parallel to the proximal edge, a distal edge, opposite the proximal edge, extending non-parallel to the first and second lateral edges, a top surface facing a product scanning area, and a generally horizontal window positioned in the platter. The upper housing portion comprises a first protrusion located on a first side of a longitudinal centerline of the bioptic indicia reader assembly and extending forward of the generally upright window and towards the distal edge of the platter and a second protrusion located on a second side of the longitudinal centerline, opposite the first side, and extending forward of the generally upright window and towards the distal edge of the platter. The first protrusion comprises a first camera having a first field-of-view (FOV) extending at least partially over the platter and covering at least 80% of an input area adjacent the bioptic indicia reader assembly. The second protrusion comprises a second camera having a second FOV extending at least partially over the platter.

In a variation of this embodiment, the second FOV covers at least 80% of an output area adjacent the bioptic indicia reader assembly and opposite the input area.

In another variation of this embodiment, the first FOV has an inner first lateral boundary that extends behind and at an angle to the proximal edge of the platter.

In another variation of this embodiment, the angle between the inner first lateral boundary of the first FOV and the proximal edge of the platter is greater than or equal to 1 degree and less than or equal to 25 degrees.

In another variation of this embodiment, the second FOV has an inner third lateral boundary that extends behind and at an angle to the proximal edge of the platter.

In another variation of this embodiment, the angle between the inner third lateral boundary and the proximal edge of the platter is greater than or equal to 1 degree and less than or equal to 25 degrees.

In another variation of this embodiment, an inner first lateral boundary of the first FOV and an inner third lateral boundary of the second FOV form an angle that is greater than or equal to 170 degrees and less than or equal to 190 degrees.

In another variation of this embodiment, the first FOV and the second FOV encompass at least 90% of a footprint of the platter.

In another variation of this embodiment, the first FOV has an outer second lateral boundary that extends outside of and at an angle to the first lateral edge of the platter.

In another variation of this embodiment, the second FOV has an outer fourth lateral boundary that extends outside of and at an angle to the second lateral edge of the platter.

In another variation of this embodiment, a first upper boundary of the first FOV and the top surface of the platter form an angle that is greater than or equal to 50 degrees and less than or equal to 100 degrees.

In another variation of this embodiment, a second upper boundary of the second FOV and the top surface of the platter form an angle that is greater than or equal to 50 degrees and less than or equal to 100 degrees.

In another variation of this embodiment, the first protrusion comprises a third camera having a third FOV that is directed away from the first lateral edge of the platter and that has a third lower boundary that extends at an angle below the top surface of the platter.

In another variation of this embodiment, the second protrusion comprises a fourth camera having a fourth FOV that is directed away from the second lateral edge of the platter and has a fourth lower boundary that extends at an angle below the top surface of the platter.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
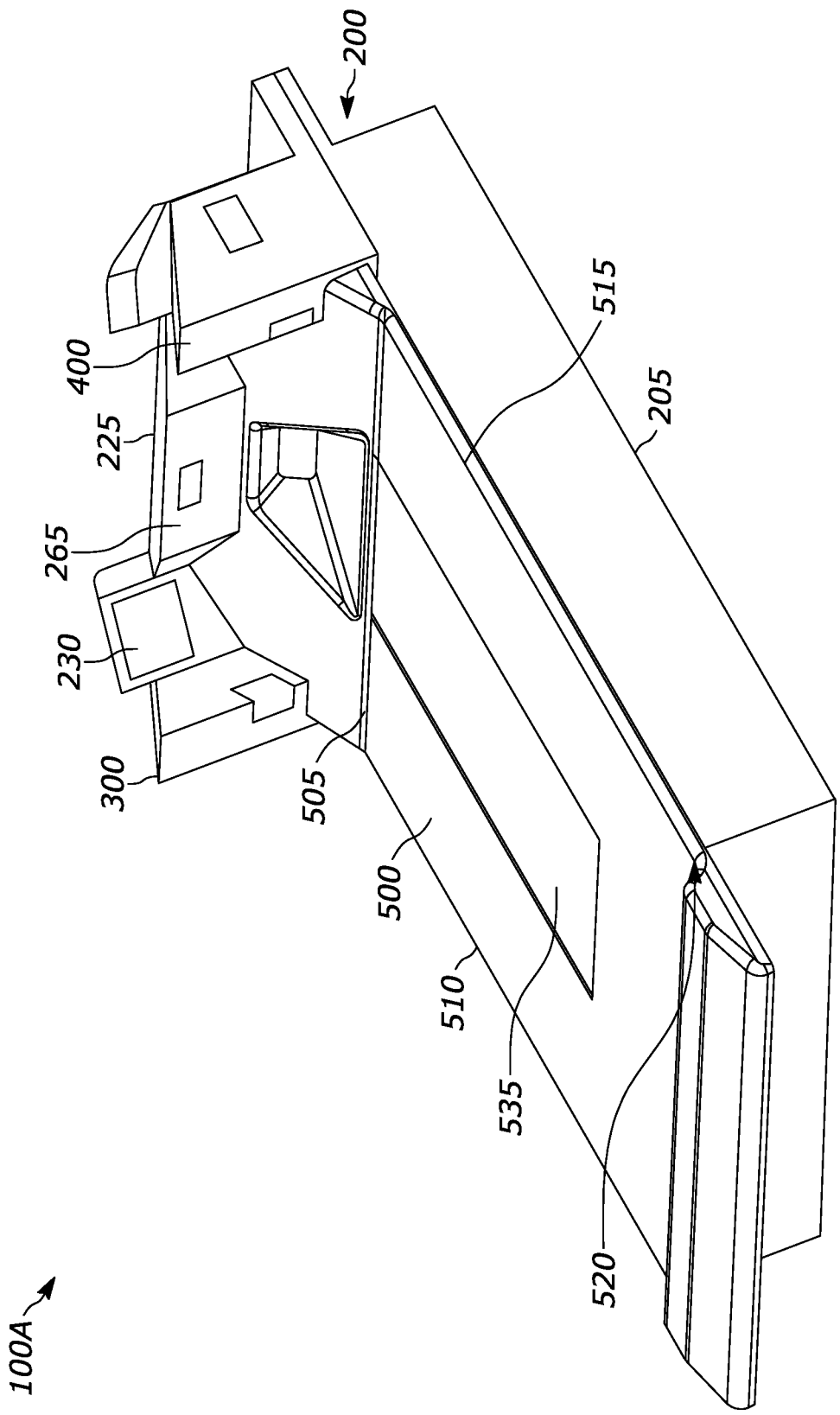
FIG. 1 illustrates a perspective view of a first example bioptic indicia reader assembly.
Figure 2:
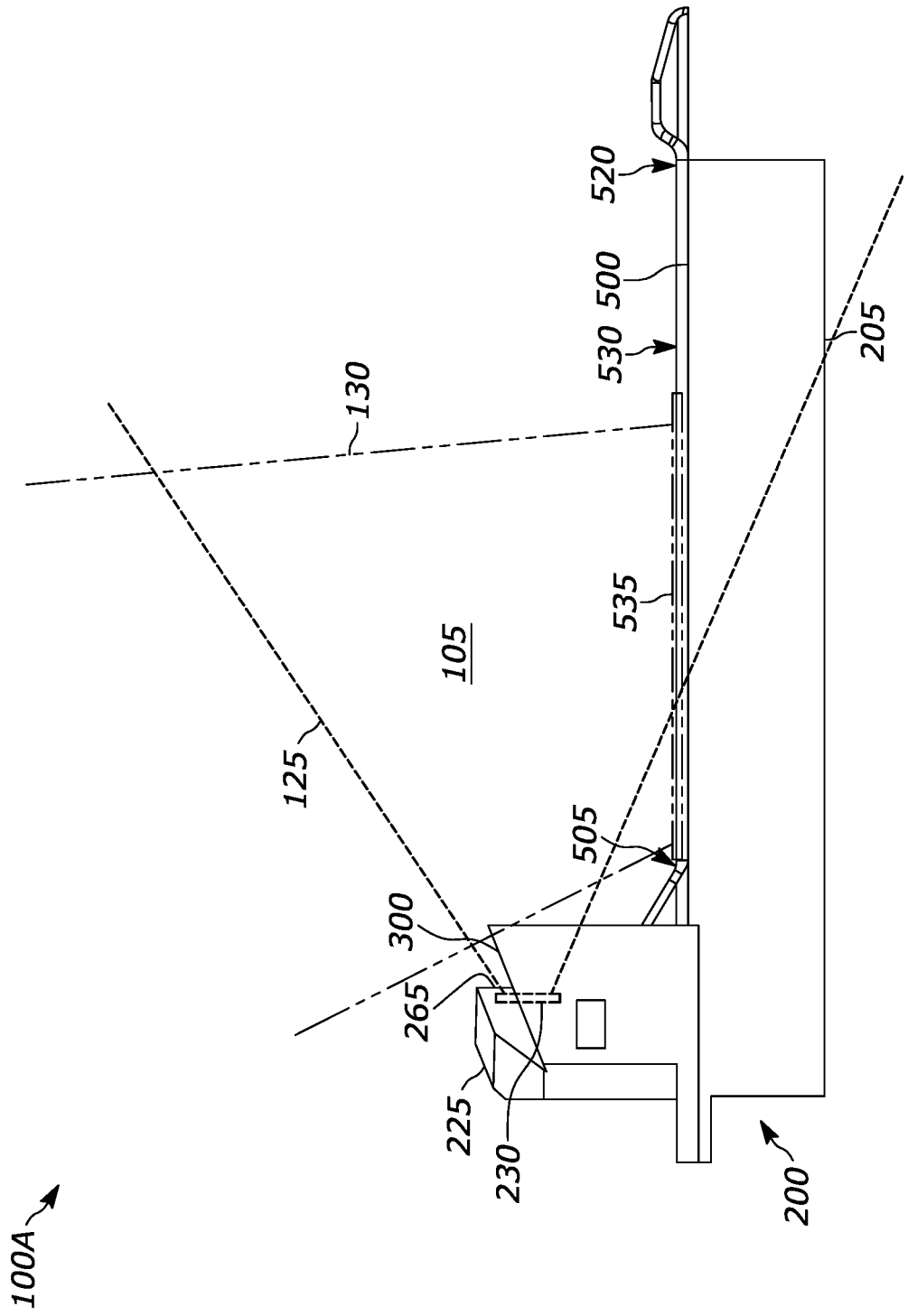
FIG. 2 illustrates a side view of the bioptic indicia reader assembly of FIG. 1, showing first and second reader FsOV.
Figure 3:
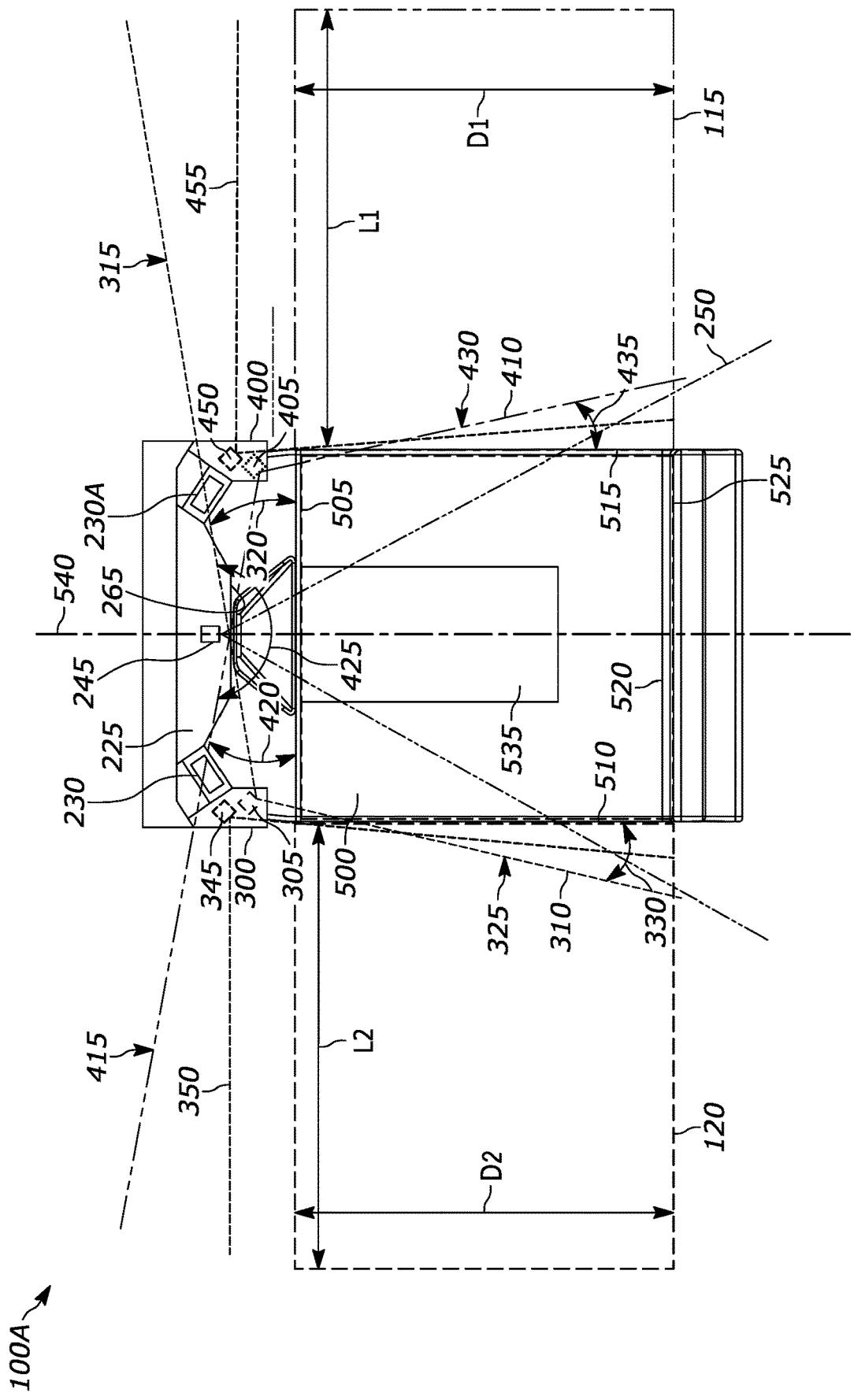
FIG. 3 illustrates a top view of the bioptic indicia reader assembly of FIG. 1.
Figure 4:
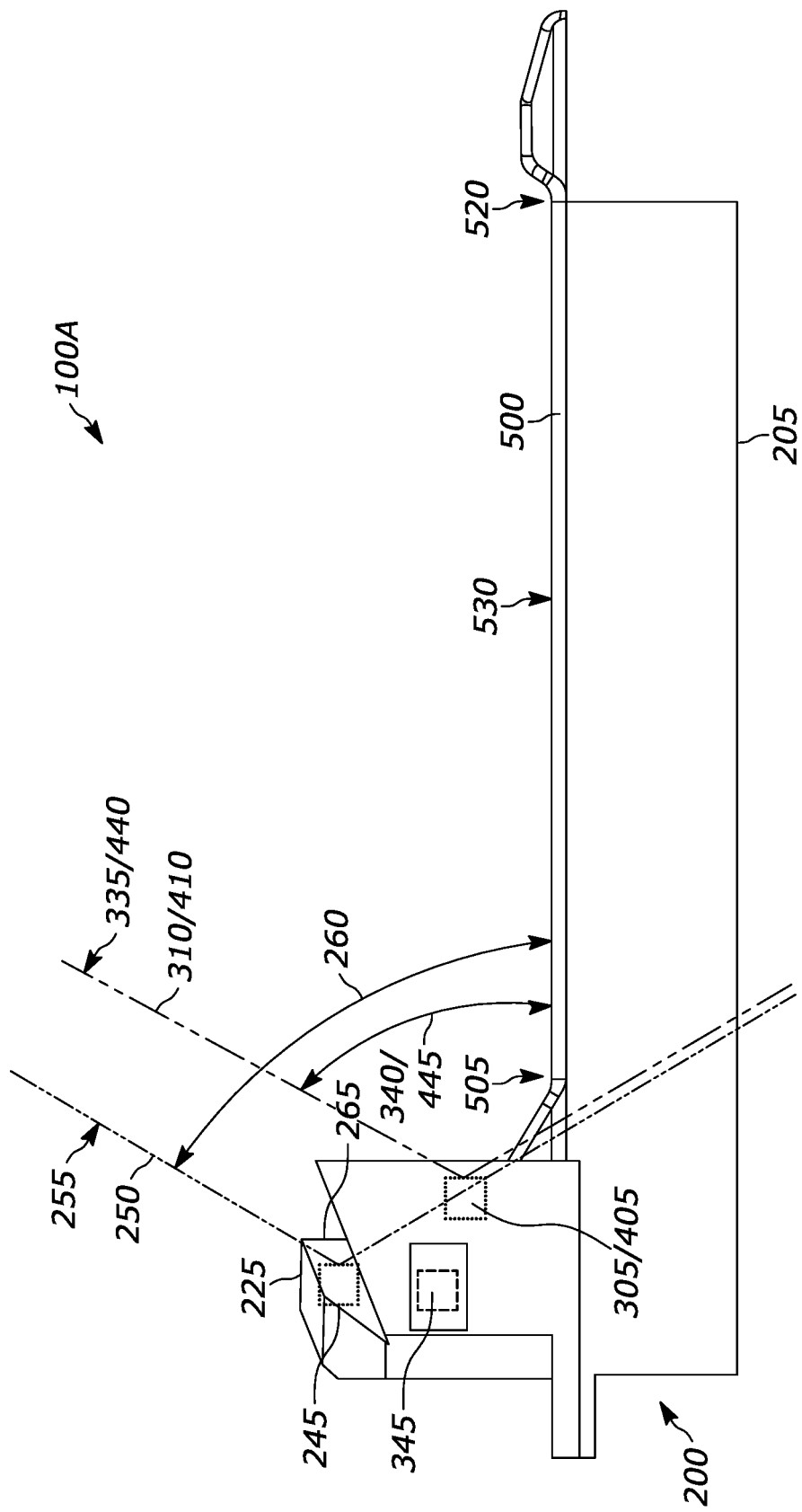
FIG. 4 illustrates a side view of the bioptic indicia reader assembly of FIG. 1, showing a first FOV of a first camera and a fifth FOV of a fifth camera.
Figure 5:
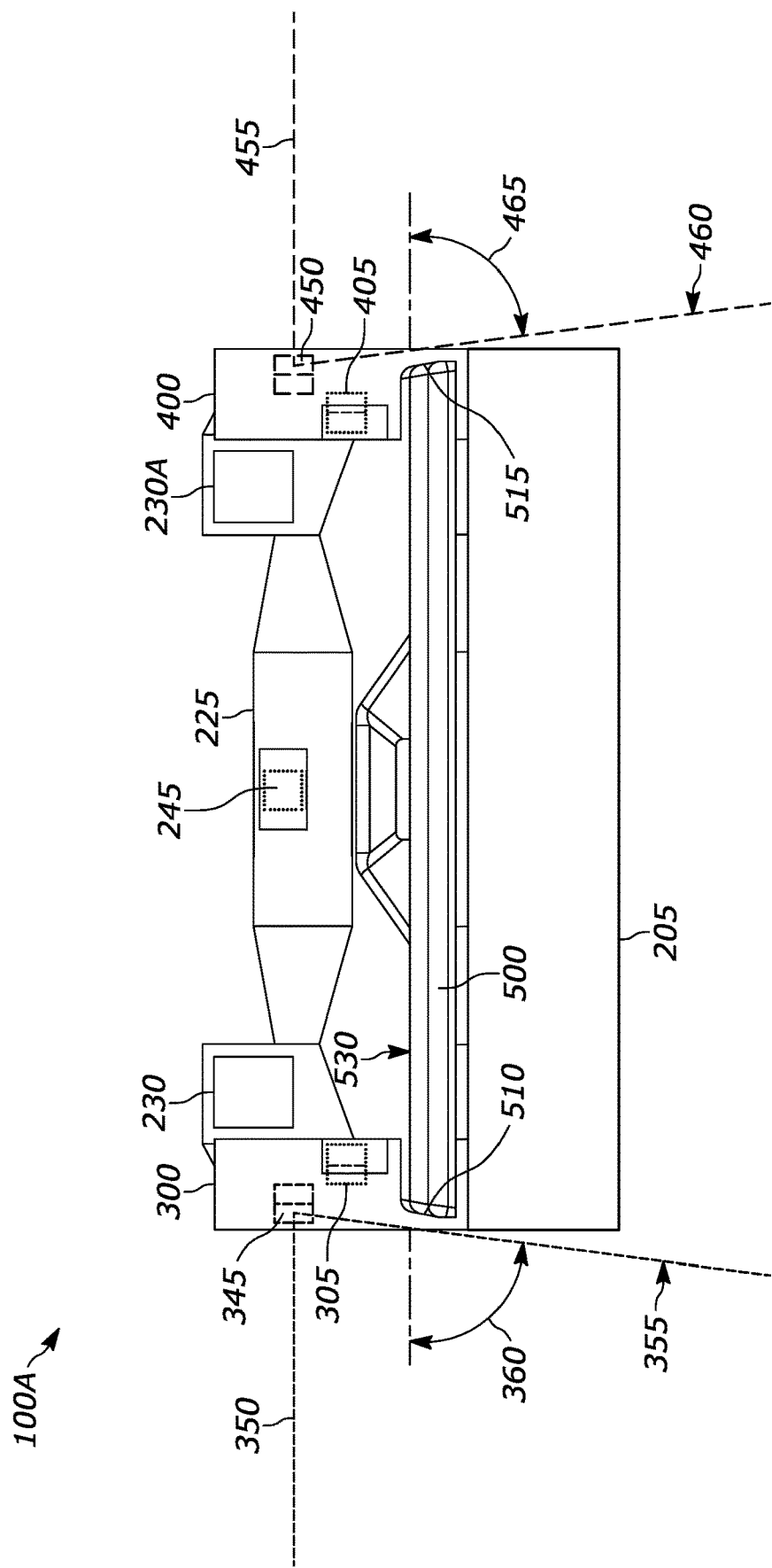
FIG. 5 illustrates a front view of the bioptic indicia reader assembly of FIG. 1.

Skilled artisans will appreciate that elements in the figures are illustrated for simplicity and clarity, have not necessarily been drawn to scale, and that details that are not necessary for an understanding of the invention or that render other details difficult to perceive may be omitted. For example, the dimensions of some of the elements in the figures may be exaggerated relative to other elements to help to improve understanding of embodiments of the present invention.

The apparatus components have been represented where appropriate by conventional symbols in the drawings, showing only those components and specific details that are pertinent to understanding the examples of the present invention so as not to obscure the disclosure with details that will be readily apparent to those of ordinary skill in the art having the benefit of the description herein.

DETAILED DESCRIPTION

The example bioptic indicia reader assemblies disclosed herein provide expanded vision capabilities, similar to those provided by high-end vision systems with overhead cameras, with components that are contained within the footprint/volume of the bioptic indicia reader assembly (i.e., without external cameras positioned above the bioptic indica reader). This can allow users that have certain checkout arrangements that they do not want to change to upgrade to a bioptic indicia reader assembly with expanded vision capabilities without changing the checkout arrangement.

The example bioptic indicia reader assemblies include protrusions on the bioptic indicia reader housing (or housings that can be mounted to an existing bioptic indicia reader housing) that each include one or more cameras. Locating multiple cameras in multiple protrusions in the housing (or housings mounted to the bioptic indicia reader housing) can keep the cameras within the footprint/volume of the bioptic indicia reader, while providing a premium vision system completely contained within a form factor that can be dropped into any existing furniture solutions that current bioptic indicia reader assemblies can fit into. In some implementations, no cameras are positioned above the housing of the bioptic indicia reader assembly. In other implementations, the protrusions in the housing (or housings mounted to the bioptic indicia reader housing) can extend outside of the footprint/volume of the bioptic indicia reader if desired.

The cameras in the protrusions (or housings that can be mounted to the bioptic indicia reader housing) can be positioned and configured such that the FsOV of the cameras cover: the entirety of the product scanning area (from multiple different angles); the face of a user (from multiple different angles); an input area (e.g., top edge of a cart or a length of an input conveyor); and/or an output area (e.g., top edge of a bag or a length of an output conveyor). To cover the face of a user of average height, an additional camera could also be centered in an upper housing portion and directed upward towards the face of the user. Additional cameras can also be provided in the protrusions (or housings that can be mounted to the bioptic indicia reader housing) that are directed outward to the side and downward from the upper housing portion (e.g., to see into a cart, into a lowered bagging area, etc.).

Referring to FIGS. 1-5, a first example bioptic indicia reader assembly 100A is illustrated that can be configured to be supported by a workstation, such as a checkout counter at a point-of-sale (POS) of a retail store. In the example shown, bioptic indicia reader assembly 100A is a bioptic barcode reader, but can be any type of indicia reader desired, such as a single window barcode reader, a radio-frequency identification reader, etc. Bioptic indicia reader assembly 100A generally includes a housing 200 and a platter 500. In some implementations, a perimeter frame (not shown) could at least partially surround and support bioptic indicia reader assembly 100A, a sheet metal frame (not shown) could be secured to the perimeter frame, and a scale assembly (not shown) could be positioned between bioptic indicia reader assembly 100A and the sheet metal frame to engage platter 500 to allow objects placed on platter 500 to be weighed by the scale assembly, if used. The sheet metal frame can be a single, unitary, integral part of can include multiple parts that are assembled together.

Housing 200 has a lower housing portion 205 and an upper housing portion 225 extending above lower housing portion 205. At least one generally upright window 230 can be positioned in upper housing portion 225 to allow a set of optical components positioned within housing 200 to direct at least a portion of a first reader FOV 125 through generally upright window 230. In the implementation shown, bioptic indicia reader assembly 100A includes two generally upright windows 230, 230A and intersecting FsOV extending through generally upright windows 230, 230A. However, in some implementations, bioptic indicia reader assembly 100A can include a single generally upright window or more than two generally upright windows.

Platter 500 has a proximal edge 505 that is adjacent upper housing portion 225. A first lateral edge 510 extends non-parallel (perpendicular in implementation shown) to proximal edge 505 and a second lateral edge 515, opposite first lateral edge 510, extends non-parallel (perpendicular in implementation shown) to proximal edge 505. A distal edge 520, opposite proximal edge 505, extends non-parallel (perpendicular in implementation shown) to first lateral edge 510 and second lateral edge 515. A generally horizontal window 535 can be positioned in platter 500 to allow the set of optical components to direct at least a portion of a second reader field-of-view 130 through generally horizontal window 535. First reader FOV 125 directed through generally upright window 230 (and the FOV directed through generally upright window 230A if used) and second reader field-of-view 130 directed through generally horizontal window 535 intersect to define a product scanning area 105, where an object can be scanned for sale at the POS. A top surface 530 of platter 500 faces a product scanning area 105.

Upper housing portion 225 has a first protrusion 300 located on a first side 235 of a longitudinal centerline 540 of bioptic indicia reader assembly 100A (left side in orientation shown if FIG. 3) and a second protrusion 400 located on a second side 240 of longitudinal centerline 540 (right side in orientation shown in FIG. 3), opposite first side 235. First protrusion 300 and second protrusion 400 each extend forward of generally upright window 230 and generally upright window 230A, towards distal edge 520 of platter 500 from upper housing portion 225, which can allow optical elements positioned within first protrusion 300 and/or second protrusion 400 to see past a front surface 265 of upper housing portion 225, where generally upright window 230 and generally upright window 230A are located.

First protrusion 300 in upper housing portion 225 can include a first camera 305 that has a first FOV 310 that extends at least partially over platter 500 and covers at least 80% of an input area 115 adjacent platter 500 of bioptic indicia reader assembly 100A. As used herein, input area 115 is an area adjacent bioptic indicia reader assembly 100A where a user can position a cart and/or place items to be scanned, or where an input conveyor directs items toward bioptic indicia reader assembly 100A. Input area 115 can be located on either side of bioptic indicia reader assembly 100A and can have a depth D1 that is approximately the same as the distance from proximal edge 505 of platter 500 to distal edge 520 and a length L1 that extends approximately 2 feet from second lateral edge 515 (or first lateral edge 510 depending on the particular setup) of platter 500. In the particular implementation shown, an inner first lateral boundary 315 of first FOV 310 extends behind (i.e., at an angle away from proximal edge 505 of platter 500 and towards upper housing portion 225) and at an angle 320 to proximal edge 505 of platter 500, which can allow first FOV 310 to substantially cover input area 115. Angle 320 between inner first lateral boundary 315 and proximal edge 505 can be greater than or equal to 1 degree and less than or equal to 25 degrees. In the implementation shown, angle 320 is 10 degrees, which allows first FOV 310 to cover all of input area 115. First FOV 310 also has an outer second lateral boundary 325, opposite inner first lateral boundary 315, that extends outside of and at an angle 330 to first lateral edge 510 of platter 500. Angle 330 between outer second lateral boundary 325 and first lateral edge 510 can be greater than or equal to 0 degrees and less than or equal to 5 degrees, which can provide substantial coverage of product scanning area 105 by first FOV 310. First FOV 310 also has a first upper boundary 335 that forms an angle 340 with top surface 530 of platter 500. Angle 340 can be greater than or equal to 50 degrees and less than or equal to 100 degrees. In the implementation shown, angle 340 is 60 degrees, which can allow first FOV 310 to encompass the face of an average height user.

First camera 305 can also be configured to identify a predetermined illumination, such as a light of a certain color, brightness, and/or duration, that indicates a good scan of a barcode on a product, which can be used to verify that all products passed through first FOV 310 have been properly scanned before they are placed in output area 120.

First protrusion 300 can also include a third camera 345 that has a third FOV 350 that is directed away from first lateral edge 510 of platter 500. A third lower boundary 355 of third FOV 350 can extend at an angle 360 below top surface 530 of platter 500, which can allow third FOV 350 to see into a cart positioned in input area 115 or to see products placed in input area 115.

Second protrusion 400 in upper housing portion 225 includes a second camera 405 that has a second FOV 410 that extends at least partially over platter 500 and covers at least 80% of an output area 120, opposite input area 115, adjacent platter 500 of bioptic indicia reader assembly 100A. As used herein, output area 120 is an area adjacent bioptic indicia reader assembly 100A where a user can place/bag items already scanned, or where an output conveyor directs items away from bioptic indicia reader assembly 100A. Output area 120 can be located on either side of bioptic indicia reader assembly 100A, opposite input area 115, and can have a depth D2 that is approximately the same as the distance from proximal edge 505 of platter 500 to distal edge 520 and a length L2 that extends approximately 2 feet from first lateral edge 510 (or second lateral edge 515 depending on the particular setup) of platter 500. In the particular implementation shown, an inner third lateral boundary 415 of second FOV 410 extends behind (i.e., at an angle away from proximal edge 505 of platter 500 and towards upper housing portion 225) and at an angle 420 to proximal edge 505 of platter 500. Angle 420 between inner third lateral boundary 415 and proximal edge 505 can be greater than or equal to 1 degree and less than or equal to 25 degrees. In the implementation shown, angle 420 is 10 degrees, which allows second FOV 410 to cover all of output area 120. Second FOV 410 also has an outer fourth lateral boundary 430, opposite inner third lateral boundary 415, that extends outside of an at an angle 435 to second lateral edge 515 of platter 500. Angle 435 between outer fourth lateral boundary 430 and second lateral edge 515 can be greater than or equal to 0 degrees and less than or equal to 5 degrees, which can provide substantial coverage of product scanning area 105 by second FOV 410. Second FOV 410 also has a second upper boundary 440 that forms an angle 445 with top surface 530 of platter 500. Angle 445 can be greater than or equal to 50 degrees and less than or equal to 100 degrees. In the implementation shown, angle 445 is 60 degrees, which can allow second FOV 410 to encompass the face of an average height user.

Second camera 405 can also be configured to identify a predetermined illumination, such as a light of a certain color, brightness, and/or duration, that indicates a good scan of a barcode on a product, which can be used to verify that all products passed through second FOV 410 have been properly scanned before they are placed in output area 120.

Second protrusion 400 can also include a fourth camera 450 that has a fourth FOV 455 that is directed away from second lateral edge 515 of platter 500. A fourth lower boundary 460 of fourth FOV 455 can extend at an angle 465 below top surface 530 of platter 500, which can allow fourth FOV 455 to see into products/bags in output area 120.

In some implementations, first FOV 310 and second FOV 410 can encompass at least 90% of a footprint 525 of platter 500, which ensures coverage of platter 500 and product scanning area 105 by first FOV 310 and second FOV 410. As used herein footprint 525 of platter 500 is the outer perimeter of platter 500 when looking straight down from above bioptic indicia reader assembly 100A.

In some implementations, upper housing portion 225 can also include a fifth camera 245 that can be positioned in upper housing portion 225 and proximate a longitudinal centerline 540 of bioptic indicia reader assembly 100A. As used herein, proximate longitudinal centerline 540 means within 1 inch of longitudinal centerline 540 in any direction. Fifth camera 245 can have a fifth FOV 250 that extends over platter 500. A fifth upper boundary 255 of fifth FOV 250 can form an angle 260 with top surface 530 of platter 500 that is greater than or equal to 50 degrees and less than or equal to 100 degrees. In the implementation shown, angle 260 is approximately 60 degrees, which can allow fifth FOV 250 to encompass the face of an average height user.

In some implementations, bioptic indicia reader assembly 100A can also include a microphone (not shown), or other audio detector, that is positioned at least partially within housing 200 and that can be configured to identify a predetermined audio signal, such as a sound of a certain tone, loudness, and/or duration, that indicates a good scan of a barcode on a product, which can be used to verify that all products passed through first FOV 310 and/or second FOV 410 have been properly scanned before they are placed in output area 120.

Figure 6:
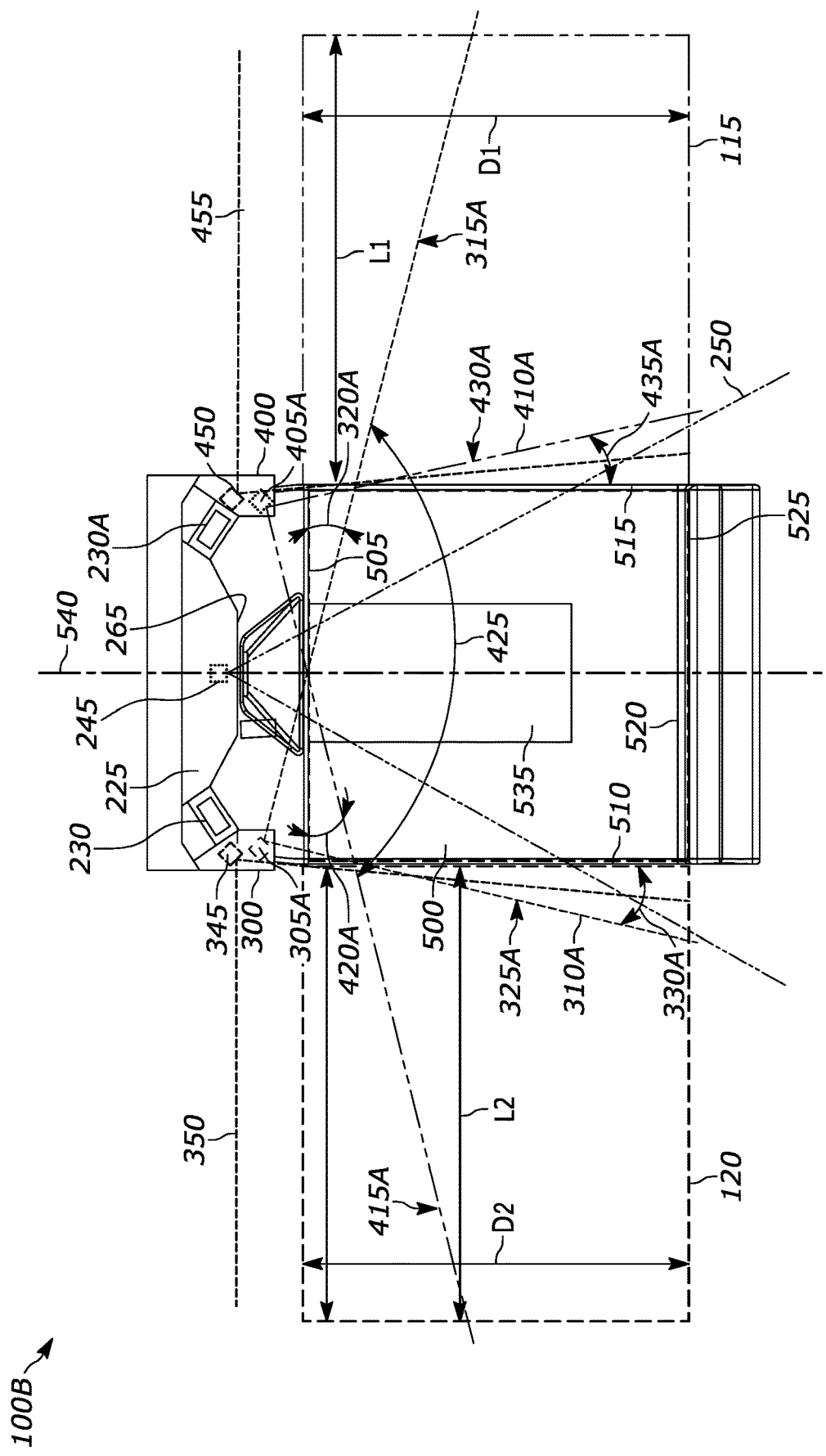
FIG. 6 illustrates a top view of a second example bioptic indicia reader assembly.
Figure 7:
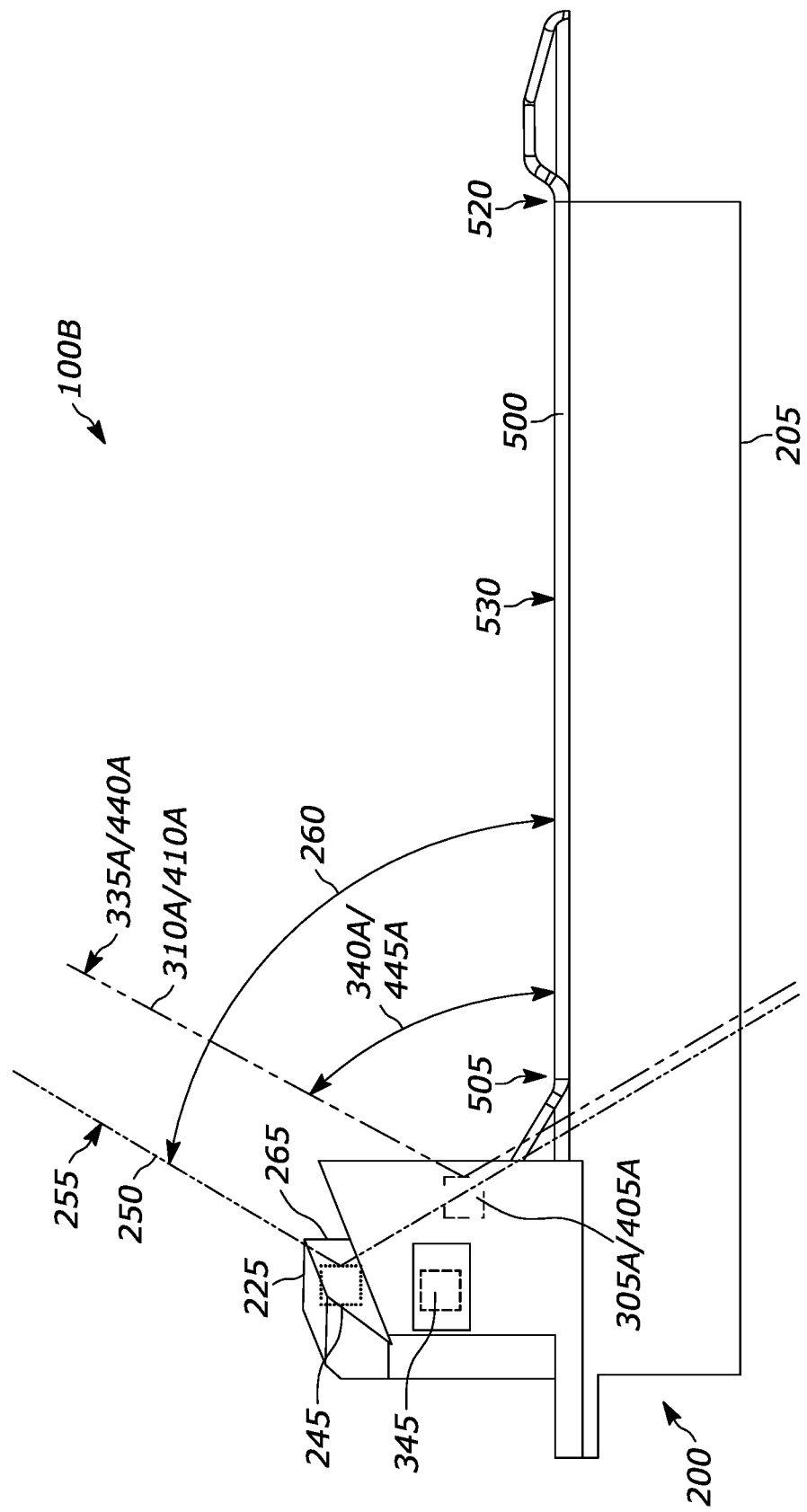
FIG. 7 illustrates a side view of the bioptic indicia reader assembly of FIG. 6.
Figure 8:
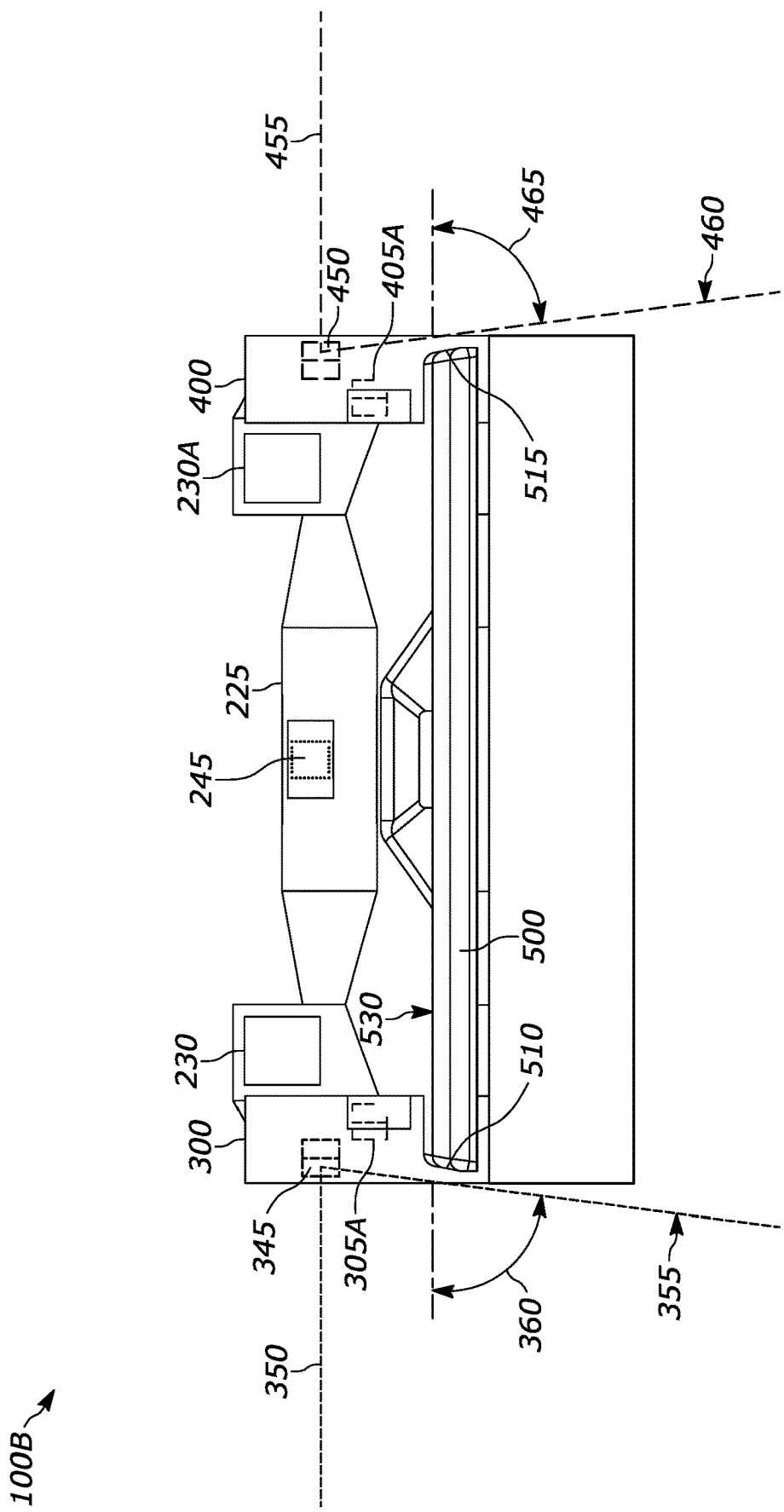
FIG. 8 illustrates a front view of the bioptic indicia reader assembly of FIG. 6.

Referring to FIGS. 6-8, a second example bioptic indicia reader assembly 100B is illustrated, which generally includes housing 200 and platter 500, as described above for bioptic indicia reader assembly 100A.

In bioptic indicia reader assembly 1001B, first protrusion 300 in upper housing portion 225 can include a first camera 305A that has a first FOV 310A that extends at least partially over platter 500 and covers at least 80% of input area 115 adjacent platter 500 of bioptic indicia reader assembly 100B. First FOV 310A has an inner first lateral boundary 315A and an outer second lateral boundary 325A, opposite inner first lateral boundary 315A. In the particular implementation shown, inner first lateral boundary 315A of first FOV 310A can extend in front of (i.e., at an angle towards proximal edge 505 of platter 500 and away from upper housing portion 225) and at an angle 320A to proximal edge 505 of platter 500, but could also extend behind and at angle 320 to proximal edge 505 of platter 500, as described above for first FOV 310. Angle 320A between inner first lateral boundary 315A and proximal edge 505 can be greater than or equal to 1 degree and less than or equal to 25 degrees. In the implementation shown, angle 320A is 10 degrees, which allows first FOV 310 to cover at least 80% of input area 115. Outer second lateral boundary 325A extends outside of and at angle 330A to first lateral edge 510 of platter 500. Angle 330A between outer second lateral boundary 325A and first lateral edge 510 can be greater than or equal to 0 degrees and less than or equal to 5 degrees, which can provide substantial coverage of product scanning area 105 by first FOV 310A. First FOV 310A also has a first upper boundary 335A that forms an angle 340A with top surface 530 of platter 500. Angle 340A can be greater than or equal to 50 degrees and less than or equal to 100 degrees. In the implementation shown, angle 340A is 60 degrees, which can allow first FOV 310A to encompass the face of an average height user.

First camera 305A can also be configured to identify a predetermined illumination, such as a light of a certain color, brightness, and/or duration, that indicates a good scan of a barcode on a product, which can be used to verify that all products passed through first FOV 310A have been properly scanned before they are placed in output area 120.

First protrusion 300 can also include third camera 345 that has third FOV 350, as described above for bioptic indicia reader assembly 100A.

In bioptic indicia reader assembly 100B, second protrusion 400 in upper housing portion 225 includes a second camera 405A that has a second FOV 410A that extends at least partially over platter 500 and covers at least 80% of output area 120, opposite input area 115, adjacent platter 500 of bioptic indicia reader assembly 100B. Second FOV 410A has an inner third lateral boundary 415A and an outer fourth lateral boundary 430A. In the particular implementation shown, inner third lateral boundary 415A extends in front of (i.e., at an angle towards proximal edge 505 of platter 500 and away from upper housing portion 225) and at an angle 420A to proximal edge 505 of platter 500, but could also extend behind and at angle 420 to proximal edge 505 of platter 500, as described above for second FOV 410. Angle 420A between inner third lateral boundary 415A and proximal edge 505 can be greater than or equal to 1 degree and less than or equal to 25 degrees. In the implementation shown, angle 420A is 10 degrees, which allows second FOV 410A to cover all of output area 120. Inner first lateral boundary 315A of first FOV 310A and inner third lateral boundary 415A of second FOV 410A form an angle 425 that is greater than or equal to 170 degrees and less than or equal to 190 degrees. Outer fourth lateral boundary 430A extends outside of and at angle 435A to second lateral edge 515 of platter 500. Angle 435A between outer fourth lateral boundary 430A and second lateral edge 515 can be greater than or equal to 0 degrees and less than or equal to 5 degrees, which can provide substantial coverage of product scanning area 105 by second FOV 410A. Second FOV 410A also has a second upper boundary 440A that forms an angle 445A with top surface 530 of platter 500. Angle 445A can be greater than or equal to 50 degrees and less than or equal to 100 degrees. In the implementation shown, angle 445A is 60 degrees, which can allow second FOV 410A to encompass the face of an average height user.

Second camera 405A can also be configured to identify a predetermined illumination, such as a light of a certain color, brightness, and/or duration, that indicates a good scan of a barcode on a product, which can be used to verify that all products passed through second FOV 410A have been properly scanned before they are placed in output area 120.

Second protrusion 400 can also include fourth camera 450 that has fourth FOV 455, as described above for bioptic indicia reader assembly 100A.

In some implementations, first FOV 310A and second FOV 410A encompass at least 90% of footprint 525 of platter 500 which ensures coverage of platter 500 and product scanning area 105 by first FOV 310A and second FOV 410A.

In some implementations, upper housing portion 225 can also include fifth camera 245 having fifth FOV 250, as described above for bioptic indicia reader assembly 100A.

In some implementations, bioptic indicia reader assembly 100B can also include a microphone (not shown), or other audio detector, that is positioned at least partially within housing 200 and that can be configured to identify a predetermined audio signal, such as a sound of a certain tone, loudness, and/or duration, that indicates a good scan of a barcode on a product, which can be used to verify that all products passed through first FOV 310A and/or second FOV 410A have been properly scanned before they are placed in output area 120.

Figure 9:
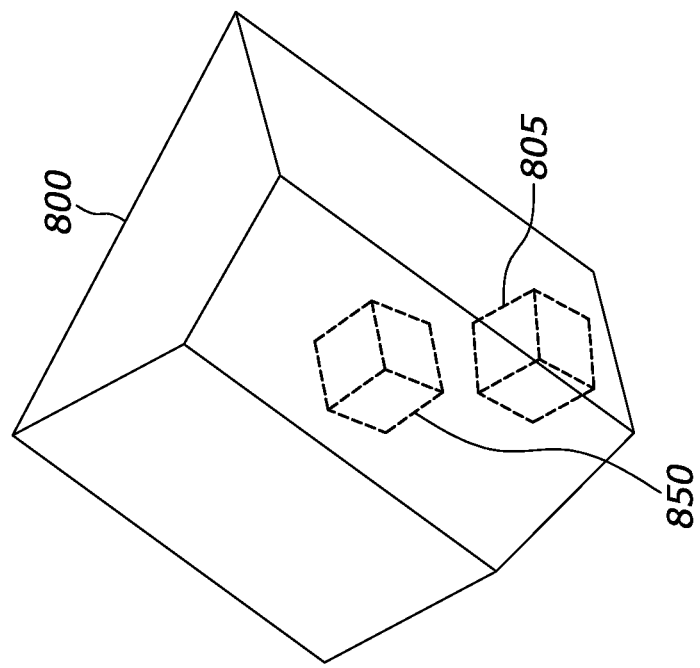
FIG. 9 illustrates a perspective view of an example vision reader assembly.
Figure 9:
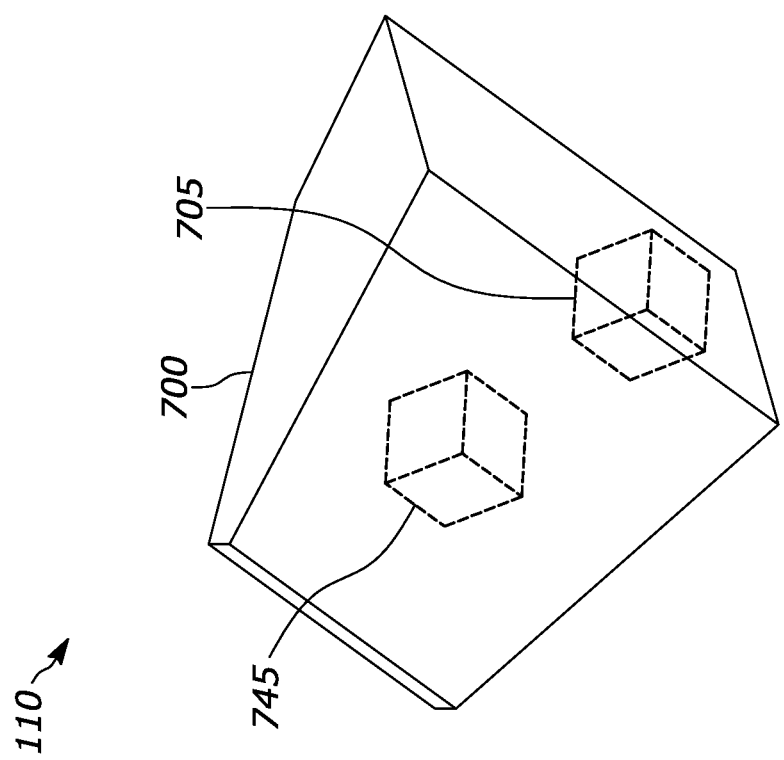
Figure 10:
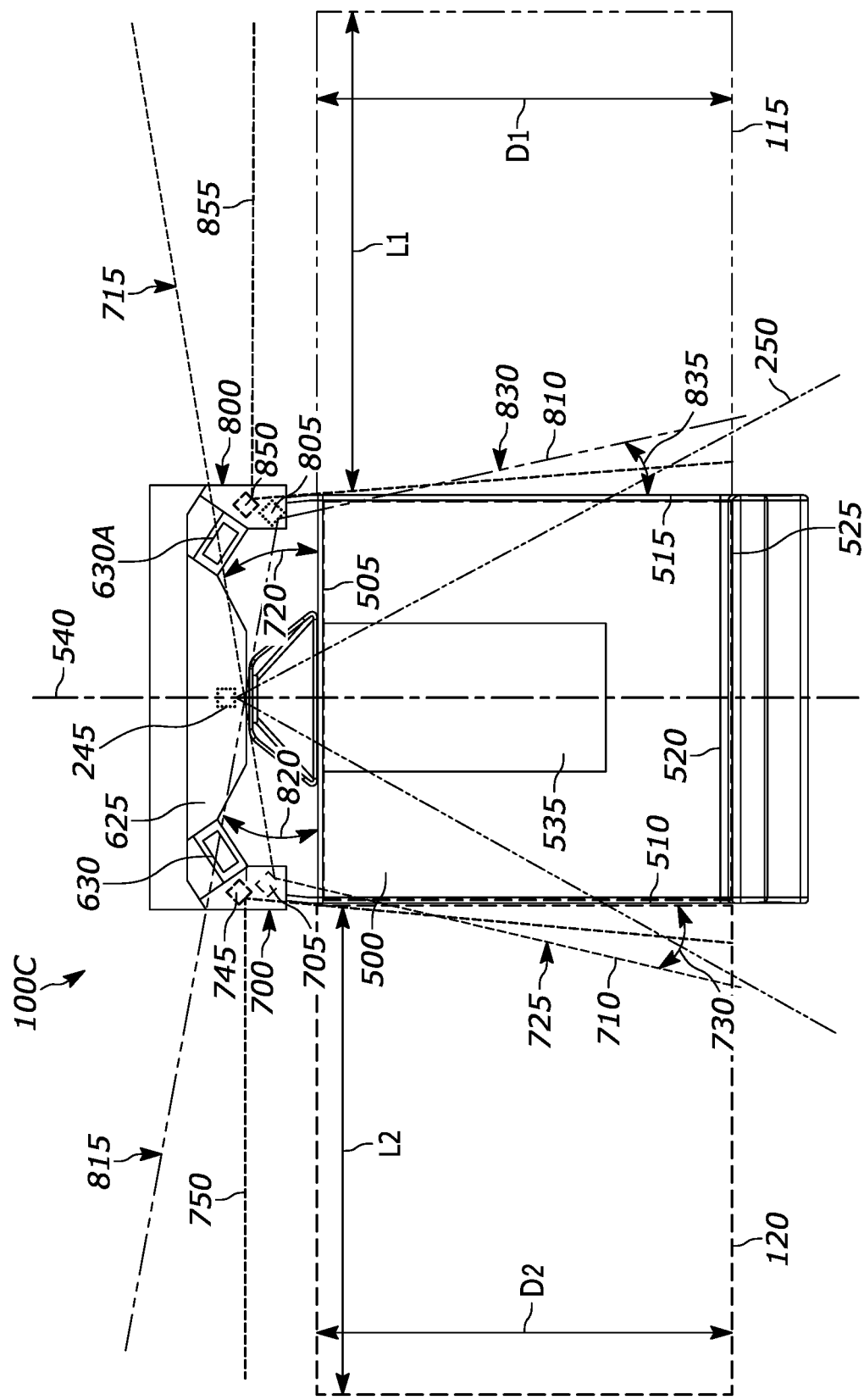
FIG. 10 illustrates a top view of the vision reader assembly of FIG. 9 secured to an example bioptic indicia reader assembly.
Figure 11:
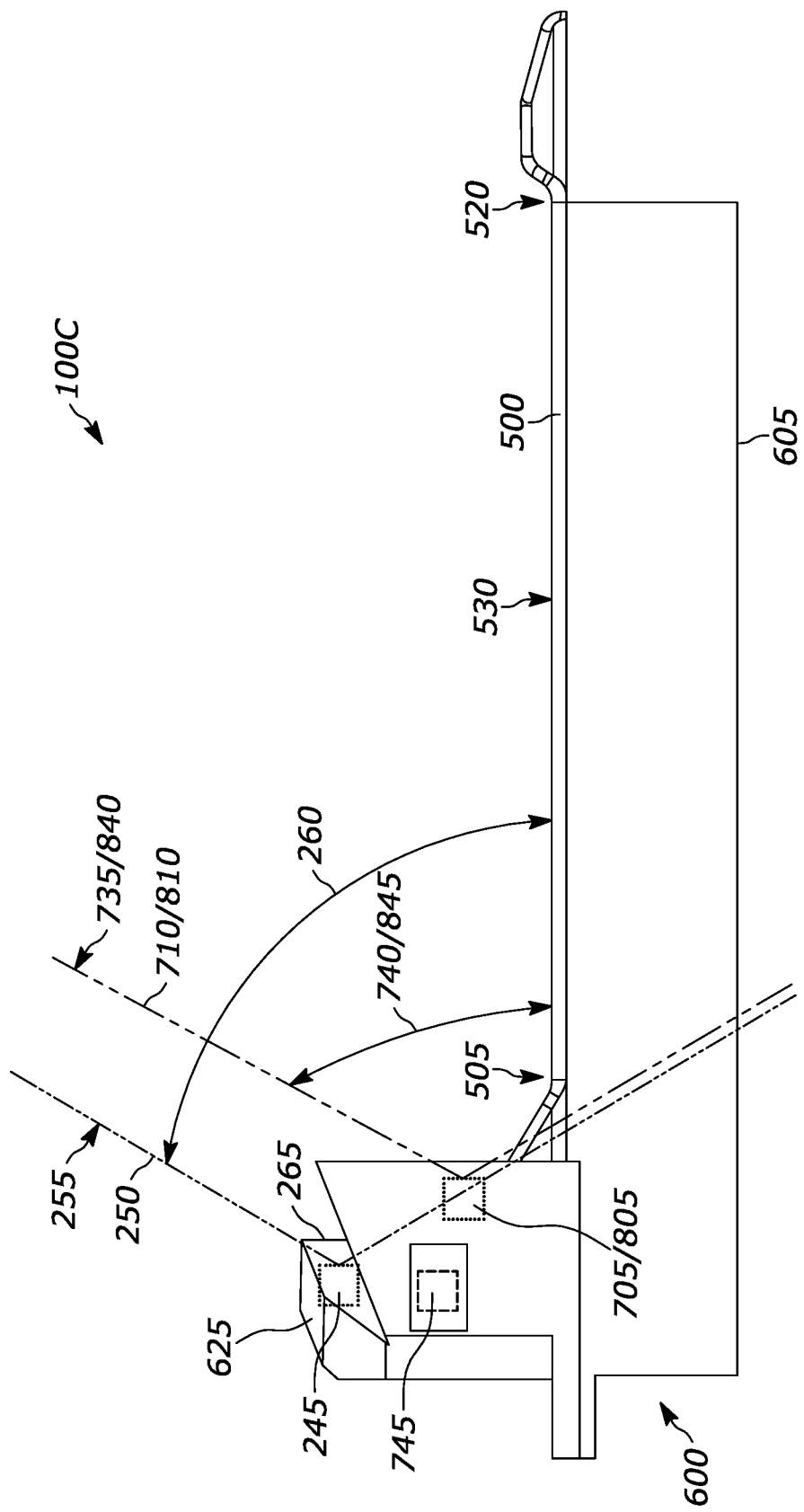
FIG. 11 illustrates a side view of the vision reader assembly and bioptic indicia reader assembly of FIG. 10.
Figure 12:
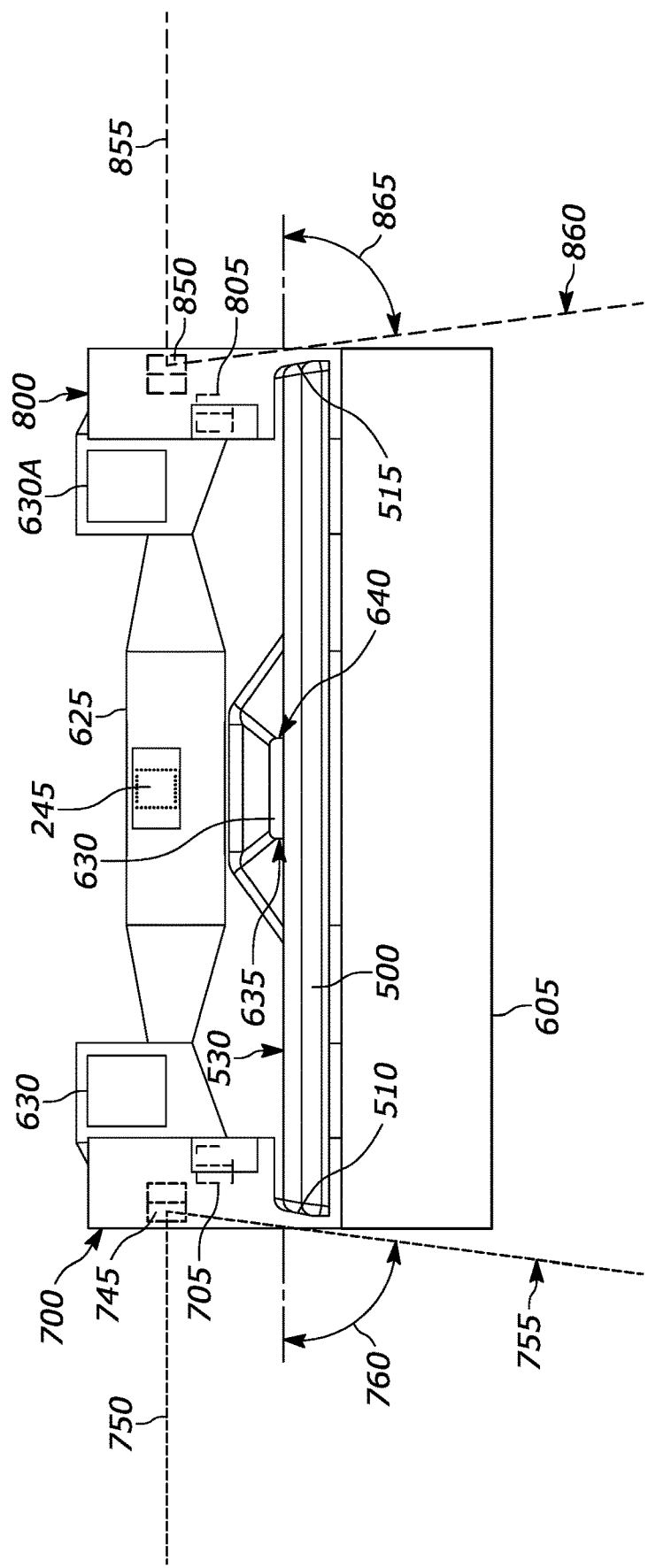
FIG. 12 illustrates a front view of the vision reader assembly and bioptic indicia reader assembly of FIG. 10.

Referring to FIG. 9, an example vision reader assembly 110 is illustrated. FIGS. 10-12 illustrate vision reader assembly 110 secured to an example bioptic indicia reader assembly 110C. In the implementation shown in FIGS. 10-12, bioptic indicia reader assembly 110C is a bioptic barcode reader, but can be any type of indicia reader desired, such as a single window barcode reader, a radio-frequency identification reader, etc. Bioptic indicia reader assembly 1000 generally includes a housing 600 (corresponding to housing 200) and platter 500, as described above. In some implementations, a perimeter frame (not shown) could at least partially surround and support bioptic indicia reader assembly 1000, a sheet metal frame (not shown) could be secured to the perimeter frame, and a scale assembly (not shown) could be positioned between bioptic indicia reader assembly 1000 and the sheet metal frame to engage platter 500 to allow objects placed on platter 500 to be weighed by the scale assembly, if used. The sheet metal frame can be a single, unitary, integral part of can include multiple parts that are assembled together.

Housing 600 has a lower housing portion 605 and an upper housing portion 625 extending above lower housing portion 605. As discussed above for housing 200, at least one generally upright window 630 can be positioned in upper housing portion 625 to allow a set of optical components positioned within housing 600 to direct at least a portion of first reader FOV 125 through generally upright window 630. In the implementation shown, housing 600 of bioptic indicia reader assembly 1000 includes two generally upright windows 630, 630A and intersecting FsOV extending through generally upright windows 630, 630A. However, in some implementations, housing 600 of bioptic indicia reader assembly 1000 can include a single generally upright window or more than two generally upright windows. As described above, first reader FOV 125 directed through generally upright window 630, the FOV directed through generally upright window 630A, and second reader field-of-view 130 directed through generally horizontal window 535 of platter 500 intersect to define a product scanning area 105, where an object can be scanned for sale at the POS.

Vision reader assembly 110 generally includes a first housing 700 and a second housing 800. First housing 700 is configured to be removably secured to a first side 635 of upper housing portion 625 of housing 600 and second housing 800 is configured to be removably secured to a second side 640 of upper housing portion 625 of housing 600, such that first housing 700 and second housing 800 each extend forward of generally upright window 630 and towards distal edge 520 of platter 500. In some implementations, first housing 700 and second housing 800 can be removably secured directly to upper housing portion, for example, through mechanical means, such as screws or hooks, through a hook and loop type fastener, via adhesives, etc. In other implementations, first housing 700 and second housing 800 can be mounted to a sleeve (e.g., a generally U-shaped sleeve) that can be removably secured over upper housing portion 625. In these implementations, control electronics can also be located within the sleeve.

First housing 700 can include a first camera 705 that has a first FOV 710 that extends at least partially over platter 500 and covers at least 80% of input area 115 adjacent platter 500 of bioptic indicia reader assembly 1000, with first housing 700 secured to upper housing portion 625, as described above for first FOV 310. In the particular implementation shown, an inner first lateral boundary 715 of first FOV 710 extends behind (i.e., at an angle away from proximal edge 505 of platter 500 and towards upper housing portion 225) and at an angle 720 to proximal edge 505 of platter 500, which can allow first FOV 710 to substantially cover input area 115. Angle 720 between inner first lateral boundary 715 and proximal edge 505 of platter 500 can be greater than or equal to 1 degree and less than or equal to 25 degrees. In the implementation shown, angle 720 is 10 degrees, which allows first FOV 710 to cover all of input area 115. First FOV 710 also has an outer second lateral boundary 725, opposite inner first lateral boundary 715, that extends outside of an at an angle 730 to first lateral edge 510 of platter 500. Angle 730 between outer second lateral boundary 725 and first lateral edge 510 can be greater than or equal to 0 degrees and less than or equal to 5 degrees, which can provide substantial coverage of a product scanning area 105 by first FOV 710. First FOV 710 also has a first upper boundary 735 that forms an angle 740 with top surface 530 of platter 500. Angle 740 can be greater than or equal to 50 degrees and less than or equal to 100 degrees. In the implementation shown, angle 740 is 60 degrees, which can allow first FOV 710 to encompass the face of an average height user.

First camera 705 can also be configured to identify a predetermined illumination, such as a light of a certain color, brightness, and/or duration, that indicates a good scan of a barcode on a product, which can be used to verify that all products passed through first FOV 710 have been properly scanned before they are placed in output area 120.

First housing 700 can also include a third camera 745 that has a third FOV 750 that is directed away from first lateral edge 510 of platter 500. A third lower boundary 755 of third FOV 750 extends at an angle 760 below top surface 530 of platter 500, which can allow third FOV 750 to see into a cart positioned in input area 115 or to see products placed in input area 115.

Second housing 800 can include a second camera 805 that has a second FOV 810 that extends at least partially over platter 500 and covers at least 80% of output area 120 adjacent platter 500, opposite input area 115, with second housing 800 secured to upper housing portion 625, as described above for second FOV 410. In the particular implementation shown, an inner third lateral boundary 815 of second FOV 810 extends behind (i.e., at an angle away from proximal edge 505 of platter 500 and towards upper housing portion 225) and at an angle 820 to proximal edge 505 of platter 500. Angle 820 between inner third lateral boundary 815 and proximal edge 505 of platter 500 can be greater than or equal to 1 degree and less than or equal to 25 degrees. In the implementation shown, angle 820 is 10 degrees, which allows second FOV 810 to cover all of output area 120. Second FOV 810 also has an outer fourth lateral boundary 830, opposite inner third lateral boundary 815, that extends outside of and at an angle 835 to second lateral edge 515 of platter 500. Angle 835 between outer fourth lateral boundary 830 and second lateral edge 515 can be greater than or equal to 0 degrees and less than or equal to 5 degrees, which can provide substantial coverage of product scanning area 105 by second FOV 810. Second FOV 810 also has a second upper boundary 840 that forms an angle 845 with top surface 530 of platter 500. Angle 845 can be greater than or equal to 50 degrees and less than or equal to 100 degrees. In the implementation shown, angle 845 is 60 degrees, which can allow second FOV 810 to encompass the face of an average height user.

Second camera 805 can also be configured to identify a predetermined illumination, such as a light of a certain color, brightness, and/or duration, that indicates a good scan of a barcode on a product, which can be used to verify that all products passed through second FOV 810 have been properly scanned before they are placed in output area 120.

Second housing 800 can also include a fourth camera 850 that has a fourth FOV 855 that is directed away from second lateral edge 515 of platter 500. A fourth lower boundary 860 of fourth FOV 855 extends at an angle 865 below top surface 530 of platter 500, which can allow fourth FOV 855 to see into products/bags in output area 120.

In some implementations, first FOV 710 and second FOV 810 can encompass at least 90% of footprint 525 of platter 500, with first housing 700 and second housing 800 secured to upper housing portion 625 of bioptic indicia reader assembly 1000, which ensures coverage of platter 500 and product scanning area 105 by first FOV 710 and second FOV 810.

In some implementations, vision reader assembly 110 can also include a microphone (not shown) (e.g., in first housing 700 and/or second housing 800), or other audio detector, that can be configured to identify a predetermined audio signal, such as a sound of a certain tone, loudness, and/or duration, that indicates a good scan of a barcode on a product, which can be used to verify that all products passed through first FOV 710 and/or second FOV 810 have been properly scanned before they are placed in output area 120.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A bioptic indicia reader assembly, comprising:
   a housing having a lower housing portion, an upper housing portion extending above the lower housing portion, and a generally upright window positioned in the upper housing portion; and
   a platter having a proximal edge adjacent the upper housing portion, a first lateral edge extending non-parallel to the proximal edge, a second lateral edge, opposite the first lateral edge, extending non-parallel to the proximal edge, a distal edge, opposite the proximal edge, extending non-parallel to the first and second lateral edges, a top surface facing a product scanning area, and a generally horizontal window positioned in the platter; wherein
   the upper housing portion comprises: a first protrusion located on a first side of a longitudinal centerline of the bioptic indicia reader assembly and extending forward of the generally upright window and towards the distal edge of the platter; and a second protrusion located on a second side of the longitudinal centerline, opposite the first side, and extending forward of the generally upright window and towards the distal edge of the platter;

the first protrusion comprises a first camera having a first field-of-view (FOV) having an inner first lateral boundary that extends behind and at an angle to the proximal edge of the platter; and the second protrusion comprises a second camera having a second FOV having an inner third lateral boundary that extends behind and at an angle to the proximal edge of the platter.

2. The bioptic indicia reader assembly of claim 1, wherein the angle between the inner first lateral boundary of the first FOV and the proximal edge of the platter is greater than or equal to 1 degree and less than or equal to 25 degrees.

3. The bioptic indicia reader assembly of claim 2, wherein the angle between the inner third lateral boundary and the proximal edge of the platter is greater than or equal to 1 degree and less than or equal to 25 degrees.

4. The bioptic indicia reader assembly of claim 1, wherein the first FOV and the second FOV encompass at least 90% of a footprint of the platter.

5. The bioptic indicia reader assembly of claim 1, wherein the first FOV has an outer second lateral boundary, opposite the inner first lateral boundary, that extends outside of and at an angle to the first lateral edge of the platter.

6. The bioptic indicia reader assembly of claim 5, wherein the second FOV has an outer fourth lateral boundary, opposite the inner third lateral boundary, that extends outside of and at an angle to the second lateral edge of the platter.

7. The bioptic indicia reader assembly of claim 1, wherein a first upper boundary of the first FOV and the top surface of the platter form an angle that is greater than or equal to 50 degrees and less than or equal to 100 degrees.

8. The bioptic indicia reader assembly of claim 7, wherein a second upper boundary of the second FOV and the top surface of the platter form an angle that is greater than or equal to 50 degrees and less than or equal to 100 degrees.

9. The bioptic indicia reader assembly of claim 1, wherein the first protrusion comprises a third camera having a third FOV that is directed away from the first lateral edge of the platter and that has a third lower boundary that extends at an angle below the top surface of the platter.

10. The bioptic indicia reader assembly of claim 1, wherein the second protrusion comprises a fourth camera having a fourth FOV that is directed away from the second lateral edge of the platter and has a fourth lower boundary that extends at an angle below the top surface of the platter.

11. A bioptic indicia reader assembly, comprising:
a housing having a lower housing portion, an upper housing portion extending above the lower housing portion, and a generally upright window positioned in the upper housing portion; and
a platter having a proximal edge adjacent the upper housing portion, a first lateral edge extending non-parallel to the proximal edge, a second lateral edge, opposite the first lateral edge, extending non-parallel to the proximal edge, a distal edge, opposite the proximal edge, extending non-parallel to the first and second lateral edges, a top surface facing a product scanning area, and a generally horizontal window positioned in the platter; wherein the upper housing portion comprises: a first protrusion located on a first side of a longitudinal centerline of the bioptic indicia reader and extending forward of the generally upright window and towards the distal edge of the platter; and a second protrusion located on a second side of the longitudinal centerline, opposite the first side, and extending forward of the generally upright window and towards the distal edge of the platter;

the first protrusion comprises a first camera having a first field-of-view (FOV) having an inner first lateral boundary and an outer second lateral boundary;

the second protrusion comprises a second camera having a second FOV having an inner third lateral boundary and an outer fourth lateral boundary; and the inner first lateral boundary and the inner third lateral boundary form an angle that is greater than or equal to 170 degrees and less than or equal to 190 degrees.

12. The bioptic indicia reader assembly of claim 11, wherein: the inner first lateral boundary extends behind and at an angle to the proximal edge of the platter; and the inner third lateral boundary extends behind and at an angle to the proximal edge of the platter.

13. The bioptic indicia reader assembly of claim 12, wherein the angle between the inner first lateral boundary of the first FOV and the proximal edge of the platter is greater than or equal to 1 degree and less than or equal to 25 degrees.

14. The bioptic indicia reader assembly of claim 13, wherein the angle between the inner third lateral boundary and the proximal edge of the platter is greater than or equal to 1 degree and less than or equal to 25 degrees.

15. The bioptic indicia reader assembly of claim 11, wherein the first FOV and the second FOV encompass at least 90% of a footprint of the platter.

16. The bioptic indicia reader assembly of claim 11, wherein the outer second lateral boundary extends outside of and at an angle to the first lateral edge of the platter.

17. The bioptic indicia reader assembly of claim 16, wherein the outer fourth lateral boundary extends outside of and at an angle to the second lateral edge of the platter.

18. The bioptic indicia reader assembly of claim 11, wherein a first upper boundary of the first FOV and the top surface of the platter form an angle that is greater than or equal to 50 degrees and less than or equal to 100 degrees.

19. The bioptic indicia reader assembly of claim 18, wherein a second upper boundary of the second FOV and the top surface of the platter form an angle that is greater than or equal to 50 degrees and less than or equal to 100 degrees.

20. The bioptic indicia reader assembly of claim 11, wherein the first protrusion comprises a third camera having a third FOV that is directed away from the first lateral edge of the platter and that has a third lower boundary that extends at an angle below the top surface of the platter.

21. The bioptic indicia reader assembly of claim 11, wherein the second protrusion comprises a fourth camera having a fourth FOV that is directed away from the second lateral edge of the platter and has a fourth lower boundary that extends at an angle below the top surface of the platter.

* * * * *